United States Patent
Klein (12)

(10) Patent No.: US 11,901,731 B2
(45) Date of Patent: Feb. 13, 2024

(54) LINE CONNECTOR FOR TRANSMITTING ELECTRIC SIGNALS

(71) Applicant: Phoenix Contact GmbH & Co. KG, Blomberg (DE)

(72) Inventor: Daniel Klein, Blomberg (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 672 days.

(21) Appl. No.: 17/053,868

(22) PCT Filed: Apr. 29, 2019

(86) PCT No.: PCT/EP2019/060881
§ 371 (c)(1),
(2) Date: Nov. 9, 2020

(87) PCT Pub. No.: WO2019/214980
PCT Pub. Date: Nov. 14, 2019

(65) Prior Publication Data
US 2021/0234400 A1  Jul. 29, 2021

(30) Foreign Application Priority Data
May 9, 2018 (DE) .................. 10 2018 111 111.8

(51) Int. Cl.
*H02J 13/00* (2006.01)
*H01R 13/717* (2006.01)
*H04L 1/24* (2006.01)

(52) U.S. Cl.
CPC .... *H02J 13/00024* (2020.01); *H01R 13/7175* (2013.01); *H02J 13/00022* (2020.01); *H04L 1/24* (2013.01)

(58) Field of Classification Search
None
See application file for complete search history.

(56) References Cited

U.S. PATENT DOCUMENTS 6,259,170 B1    7/2001  Limoge et al.
9,619,979 B1*   4/2017  Montero ............... H04L 69/03
(Continued)

FOREIGN PATENT DOCUMENTS

DE            296 19 496 U1    3/1998
DE       10 2006 005 633 B1    8/2007
EP             3 185 662 A1    6/2017

OTHER PUBLICATIONS

Phoenix Contact; Industrial Wireless—Wireless from the sensor to the network; Dec. 31, 2017.

*Primary Examiner* — Thomas S McCormack
(74) *Attorney, Agent, or Firm* — Holland & Hart LLP

(57) ABSTRACT

A line connector for transmitting electrical signals includes a housing, a first electric connection configured to transmit a first electrical signal, a second electrical connection configured to transmit a second electrical signal, and a diagnostic device. The diagnostic device is configured to monitor the first electrical signal and detect a first status of the first electric connection, and to monitor the second electrical signal and detect a second status of the second electrical connection. The housing has a housing wall with a first optical indicator and a second optical indicator. The first optical indicator is configured to generate a first optical signal representing the first status, and the second optical indicator is configured to generate a second optical signal representing the second status.

16 Claims, 3 Drawing Sheets

(56) References Cited

U.S. PATENT DOCUMENTS

| | | | | |
|---|---|---|---|---|
| 9,991,649 B1* | 6/2018 | Nguyen | ............. | H01R 13/7175 |
| 2011/0124220 A1* | 5/2011 | Su | ...................... | H01R 13/7175 |
| | | | | 439/490 |
| 2015/0058738 A1 | 2/2015 | Benkert et al. | | |
| 2016/0372973 A1 | 12/2016 | Fitzgerald et al. | | |
| 2018/0033260 A1* | 2/2018 | Dolezalek | .......... | H01R 13/6683 |

\* cited by examiner

LINE CONNECTOR FOR TRANSMITTING ELECTRIC SIGNALS

CROSS-REFERENCE TO RELATED APPLICATIONS

The present application is the national phase entry under 35 U.S.C. 371 of International Patent Application No. PCT/EP2019/060881 by Klein, entitled "LINE CONNECTOR FOR TRANSMITTING ELECTRICAL SIGNALS," filed Apr. 29, 2019; and claims the benefit of German Patent Application No. 10 2018 111 111.8 by Klein, entitled "LEITUNGSVERBINDER ZUR ÜBERTRAGUNG VON ELEKTRISCHEN SIGNALEN," filed May 9, 2018, each of which is assigned to the assignee hereof and is incorporated by reference in its entirety.

FIELD OF THE DISCLOSURE

The present disclosure relates to a line connector for transmitting electric signals.

BACKGROUND

Contactless electric connections can be used in particular for the wear-free connection of electric devices. A contactless line connector can have a wired connection for coupling electric signals into the line connector, with diagnostic lines for parameterization and/or diagnosis of the line connector typically also being provided in addition to a power supply and/or data line. Diagnostic information can be realized in a correspondingly remote manner from the line connector on a centrally arranged switching device. Disadvantageously, the functionality of the plug connection cannot be checked directly at the plug connection.

Furthermore, diagnostic data can be displayed locally on the line connector by means of a diagnostic display. Local diagnostic displays are typically arranged next to the wired connection, in particular on the rear. In the case of optical diagnostic displays, this can result in the disadvantage that only one diagnostic display can be visible in a connection consisting of two line connectors. Accordingly, the detection of the diagnostic data from both line connectors can be restricted in one viewing direction.

SUMMARY

It is the object of the present disclosure to provide a more efficient line connector which enables diagnostic data to be displayed in the largest possible field of view.

This object is achieved by the features of the independent claim. Advantageous implementations are the subject matter of the dependent claims, the description and the accompanying figures.

The present disclosure is based on the knowledge that the above object can be achieved by a line connector which comprises at least one optical display element which extends in particular in a ring shape along a circumference of the line connector and displays status information relating to an electric status, in particular a power supply and/or wireless data connection, by an circumferential lighting in order to visibly display the status information in the largest possible viewing angle range.

According to a first aspect this relates to line connectors for transmitting electric signals, comprising a housing, a first electric connection for transmitting a first electric signal and a second electric connection for transmitting a second electric signal. Furthermore, the line connector comprises a diagnostic device which is adapted to monitor the first electric signal in order to detect a first status of the first electric connection. Furthermore, the diagnostic device is adapted to monitor the second electric signal in order to detect a second status of the second electric connection;

The housing has a housing wall with a first optical indicator and a second optical indicator, the first optical indicator being adapted to generate a first optical signal which represents the first status. Furthermore, the second optical indicator is adapted to generate a second optical signal that represents the second status.

With the optical indicators, the first status or the second status can be displayed efficiently and in particular in a manner that can be detected without further aids. In particular, a user who establishes an electric connection to a line connector counterpart with the line connector can use the optical signals to detect a status of the electric connection.

The optical signals can in particular also be detectable remotely from the line connector. The line connector can be arranged in a hazardous area, for example a movement area of a robot and/or a toxic atmosphere, the optical signals having sufficient brightness and/or sufficient contrast to be recognized by a user at a distance of at least 1 m, preferably be detectable at a distance of up to 10 m.

The first electric connection can be adapted to have the first electric signal applied to it in a wired manner. The first electric signal can comprise both a supply voltage for supplying energy to the line connector and/or the line connector counterpart as well as a communication signal. Both the supply voltage and the communication signal can be transmitted to the line connector counterpart via a wireless connection by means of the second electric connection.

The second electric connection can be a wireless interface which is adapted to convert at least part of the first electric signal into an, in particular wireless second electric signal.

In contrast to conventional mechanical plug connections, the second electric connection can be used to realize an electromagnetic coupling for transmitting electrical energy and data between the line connector and the line connector counterpart. The second electric connection can in particular be adapted to establish a wireless electric connection to an electric connection of the line connector counterpart.

In particular, the electric connections can be arranged at a distance smaller than a maximum distance, wherein the intermediate space that arises between the electrical connectors can be filled with a medium. The medium can be, for example, air, water, oil or some other electromagnetically penetrable substance. This has the advantage that a robust electric connection can be realized between the line connector and the line connector counterpart, since the electric connection is protected against harsh operating conditions, for example wet and/or dusty environments. The line connector can in particular be protected according to protection class IP67 and can be accordingly sealed against the introduction of moisture and/or dust.

The line connector can furthermore have a controller which, on the basis of the status information of the diagnostic device, can be adapted to adapt electrical parameters of the second electric signal transmitted by means of the second electric connection during operation. This dynamic coordination achieves the advantage that the wireless connection can be maintained even with a relative movement of the line connector to the line connector counterpart.

The movements can be, for example, an angular tilting movement, a rotation about an axis of symmetry of the line connector and/or a translation with a change in a distance and/or an overlap area between the line connector and the line connector counterpart. Correspondingly, the line connector cannot exhibit wear due to friction, so that the service life of the line connector can be increased compared to conventional plugs.

The optical indicators can furthermore comprise a graphic display device, in particular a display, which are each adapted to show the first status or the second status in the form of a graphic image, for example a symbol and/or in the form of characters.

In one example, the housing is at least partially cylindrical and has a circumferential housing wall, the first optical indicator and/or the second optical indicator being arranged at least partially on a circumference of the housing wall.

This has the advantage that an efficient display of the respective optical signal can be realized by the respective optical indicator. The housing wall can in particular be a lateral surface of the cylindrical housing. The optical indicators can be arranged on the lateral surface in such a way that with a combination of the position of the respective optical indicator and the scattering angle of the respective optical signal, the respective optical signal can be displayed from all viewing directions in the direction of the lateral surface and can accordingly be detected by a user.

The respective optical indicator can be adapted in one piece and can display the respective optical signal in full. The respective optical indicator can furthermore have spaced-apart indicator segments which, in combination with a scattered emission of the respective optical signal, realize a complete detection of the respective optical signal from a predetermined minimum viewing distance. Furthermore, the respective optical indicator can be configured in a segment-like manner and can display the respective optical signal in predetermined, in particular circumferentially arranged surface areas.

In one example, the first status comprises a power supply status of the line connector by means of the first electric connection. A power supply of the line connector may be necessary in order to establish a wireless connection to the line connector counterpart. With the display of the energy supply status, for example, a faulty or non-existent energy supply can be displayed.

Furthermore, the first status can have a further energy supply status of the second electric connection. The energy supply can have a plurality of energy supply states. For example, a primary energy supply for the line connector by means of the first electric connection and/or a secondary energy supply for the line connector can be disturbed by the second electric connection. Furthermore, establishing the wireless connection can be dependent on the energy supply state.

In one example, the second electric connection is adapted to establish a wireless connection to a line connector counterpart and to transmit the second electric signal via the wireless connection, the second status comprising a signal strength of the wireless connection between the line connector and the line connector counterpart.

With the signal strength of the wireless connection, a susceptibility to errors and/or a possible failure of the transmission of the second electric signal via the second electric connection can be detected. The signal strength can determine a transmission speed in relation to a transmission of data and/or a transmission efficiency in relation to an electrical power transmission. The line connector can also be adapted to disconnect the wireless connection when the signal strength falls below a minimum value.

In one example, the second electric connection is adapted to transmit electrical energy for supplying energy to the line connector counterpart and to transmit data. For example, the line connector can be an active connection element and/or the line connector counterpart can be a passive connection element without its own power supply. When the line connector counterpart approaches the line connector, the line connector can transmit both data and electrical energy to the line connector counterpart in order to supply the line connector counterpart and/or electric devices connected to the line connector counterpart with electrical energy and control them according to the transmitted data.

In one example, the first optical indicator comprises a first illuminant and/or the second optical indicator comprises a second illuminant, the first illuminant and/or the second illuminant being adapted to generate an optical signal on the housing wall over the entire circumference.

The respective illuminants can be adapted in multiple colors in order to be able to display the respective status in color-coded fashion. For example, the illuminants can light up in a preselected color or color combination depending on the respective status. Furthermore, the respective status can be displayed in coded brightness and/or flashing patterns. The full display of the respective status by the respective illuminant means that the respective status can be displayed efficiently in the largest possible viewing angle range. The respective illuminant can end flush with the housing wall or protrude from the housing wall. With the protrusion from the housing wall, in particular a display of the respective status can be realized perpendicular to a surface normal of the housing wall.

The respective illuminant can have a light source and a light guide for the circumferential distribution of the light emitted by the light source. Furthermore, the respective illuminant can have light sources which are distributed along a circumference of the housing wall. In particular, the respective illuminant can be adapted to emit the respective optical signals with a brightness that is homogeneous along the circumference. Furthermore, the first luminous means and the second luminous means can be adapted to shine with a brightness in a predetermined range, in particular with the same brightness.

In one example, the respective optical indicator can comprise a reflective color element which, when illuminated by a light source, generates the respective optical signal.

In one example, the first illuminant depending on the first status and/or the second illuminant depending on the second status are adapted to emit light in a wavelength range or a selected number of wavelength ranges of a plurality of predetermined wavelength ranges or not to emit light. This has the advantage that a clear color coding of the respective status can be achieved.

In one example, the first illuminant depending on the first status and/or the second illuminant depending on the second status is adapted to generate optical signals in mutually different wavelength ranges in order to be able to distinguish the optical signals of the first optical indicator from the optical signals of the second optical indicator.

For example, the first optical indicator can light up in the colors red, yellow and green and the second indicator can light up in colors which, with respect to human perception, have a maximum distance or maximized contrast to the colors of the first optical indicator and are maximally distanced in respect to each other. This can be, for example, the colors blue, orange and purple.

In one example, the first optical indicator and the second optical indicator are adapted to generate optical signals in the same wavelength ranges in order to display connection states coherently in accordance with the display information. This has the advantage that a deviation from a regular operating state, for example all optical indicators light up in the color green, can be detected efficiently. The optical signals can also be generated by superimposing light signals which are emitted by separate illuminants or multiple illuminants, in particular RGB-LEDs.

In one example, the first illuminant is arranged in a first cross-sectional plane of the housing and the second illuminant is arranged in a second cross-sectional plane of the housing and/or the first illuminant is arranged adjacent to the second illuminant.

The cross-sectional planes can in particular be aligned parallel or at an angle to a circumference of the circumferential housing wall. With the arrangement of the illuminants next to one another, the particular advantage can be achieved that the optical signals are directly comparable to one another, and optical signals that are different from one another can be efficiently detected. Furthermore, the illuminants can be spaced apart from one another along a longitudinal axis of the housing by a spacer element.

In one example, the diagnostic device is adapted to detect whether a supply voltage is present at the first electric connection and/or to check whether the supply voltage corresponds to predetermined voltage parameters and, when detecting a supply voltage, to change the first status as a function of the predetermined voltage parameters.

In one example, the diagnostic device is adapted to detect whether there is a data transmission connection by means of the second electric connection and/or to check whether the data transmission connection corresponds to predetermined connection parameters and, when a data transmission connection is detected, to change the second status depending on the predetermined connection parameters.

The diagnostic device can in particular be adapted to detect a frequency and/or a voltage amplitude of the supply voltage and/or a current of an electrical current flowing through the first electric connection. The first status represents in particular the electrical energy supply of the connector and/or a transmission of electrical energy by means of the second electric connection. The second status represents in particular the status of a wireless connection between the line connector and the line connector counterpart, wherein in particular a signal-to-noise ratio and/or a data transmission rate can be determined.

In one example, the first optical indicator comprises a scattering element which is adapted to scatter the first optical signal of the first optical indicator starting from a normal vector of the lateral surface with a scattering angle of up to 90°.

The scattering element can in particular be adapted to scatter light diffusely, so that the first optical signal can be emitted with the largest possible emission angle range from a surface with a homogeneous luminance. As a result, a circumferential homogeneous emission of the first optical signal can be realized with a point light source, for example. The scattering element can furthermore have an optical waveguide and a diffuser, the optical waveguide being adapted to guide light from a light source to the diffuser and the diffuser being adapted to scatter the light.

Furthermore, the second optical indicator can comprise a further scatter element. The scattering properties of the scattering element and the further scattering element can be different in order to enable the first optical signal to be differentiated from the second optical signal also on the basis of the light distribution.

In one example, the housing is rectangular and has a circumferential housing wall, the first optical indicator and/or the second optical indicator being arranged at least partially on a circumference of the housing wall.

In one example, the first optical indicator and/or the second optical indicator each comprise a light-emitting diode and/or an optical waveguide.

In one example, the first optical indicator is adapted to display an optical signal with a preselected wavelength, brightness and/or flashing sequence by means of the light-emitting diode as a function of the first status and/or wherein the second optical indicator is adapted to display an optical signal with a preselected wavelength, brightness and/or flashing sequence by means of the further light-emitting diode as a function of the second status.

In one example, the first optical indicator comprises a first colorant and a second colorant, the optical indicator being adapted to visibly display the first colorant and to hide the second colorant or to hide the first colorant and display the second colorant based on the first status.

In one example, the housing has a cover surface and the second electric connection and/or the first optical indicator are at least partially arranged on the cover surface.

BRIEF DESCRIPTION OF THE DRAWINGS

Further examples of the principles described herein are explained with reference to the accompanying figures.

DETAILED DESCRIPTION

Figure 1:
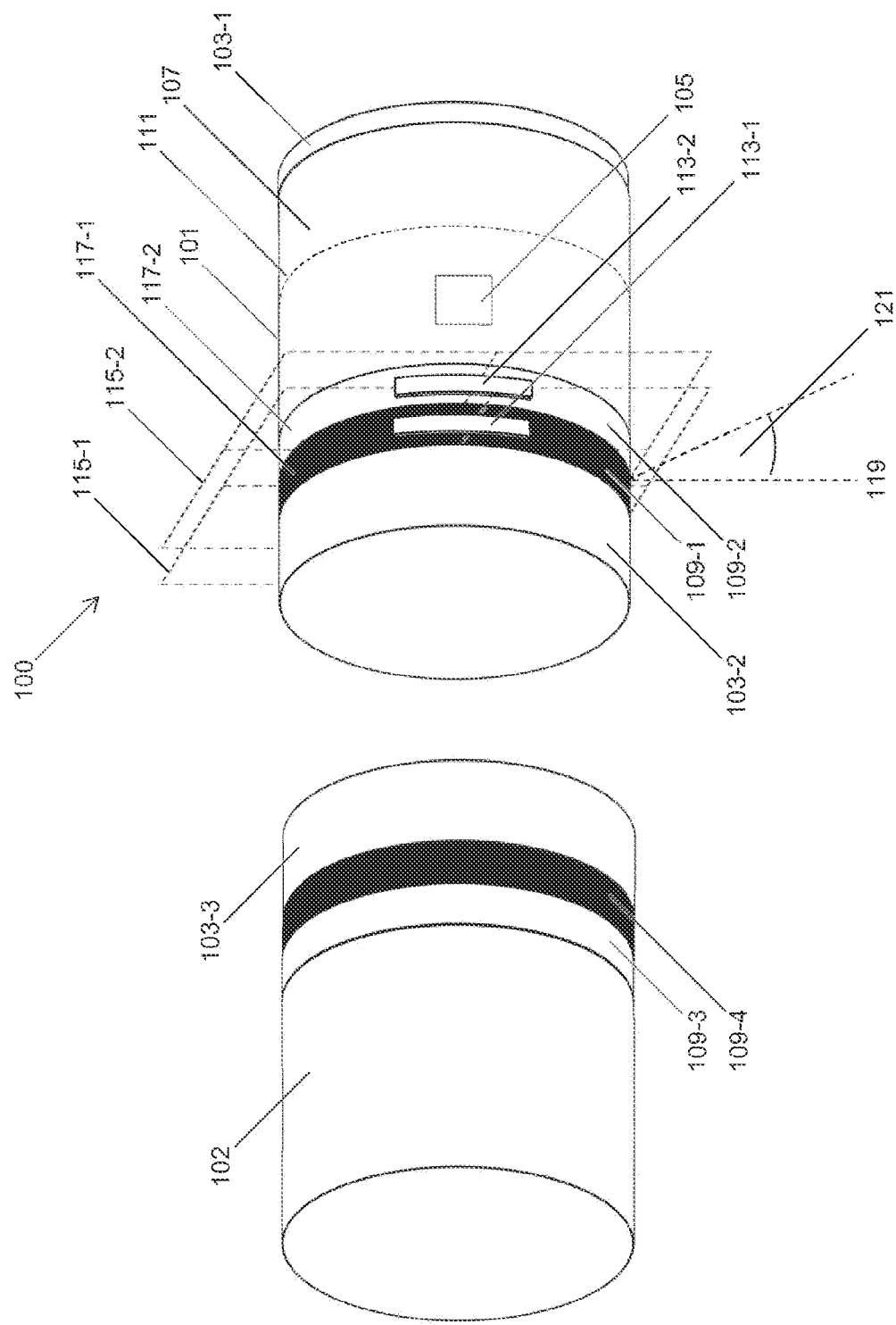
FIG. 1 shows a line connector and a line connector counterpart according to the principles described herein.

FIG. 1 shows a schematic illustration of a line connector 100 for transmitting electric signals according to an example of principles of the present disclosure. The line connector 100 comprises a housing 101, a first electric connection 103-1 for transmitting a first electric signal and a second electric connection 103-2 for transmitting a second electric signal. The line connector 100 further comprises a diagnostic device 105, which is adapted to monitor the first electric signal in order to detect a first status of the first electric connection 103-1, and which is adapted to monitor the second electric signal to determine a second status of the second electric connection 103-2.

The housing 101 has a housing wall 107 with a first optical indicator 109-1 and a second optical indicator 109-2. Furthermore, the first optical indicator 109-1 is adapted to generate a first optical signal which represents the first status, and the second optical indicator 109-2 is adapted to generate a second optical signal which represents the second status.

Furthermore, the housing 101 is cylindrical and has a circumferential housing wall 107, and the first optical indicator 109-1 and the second optical indicator 109-2 are arranged on a circumference 111 of the housing wall 107.

The second electric connection 103-2 is adapted to establish a wireless connection to a line connector counterpart 102 and to transmit the second electric signal via the wireless connection, the second status comprising a signal strength of the wireless connection between the line connector 100 and the line connector counterpart 102. Furthermore, the second electric connection 103-2 is adapted to transmit electrical energy for supplying energy to the line connector counterpart 102 and to transmit data.

The first optical indicator 109-1 comprises a first illuminant 113-1 and the second optical indicator 109-2 comprises a second illuminant 113-2. The first illuminant 113-1 and the second illuminant 113-2 are adapted to generate an optical signal on the housing wall 107 in each case on the full circumference.

The first illuminant 113-1 and the second illuminant 113-2 are each adapted to emit light in a wavelength range or a selected number of wavelength ranges from a plurality of predetermined wavelength ranges or not to emit light. The respective wavelength range can be determined by the first status and/or the second status. Furthermore, the first optical indicator 109-1 and the second optical indicator 109-2 are adapted to generate optical signals in the same wavelength ranges in order to coherently display connection states corresponding to the display information.

The first illuminant 113-1 is arranged in a first cross-sectional plane 115-1 of the housing 101 and the second illuminant 113-2 is arranged in a second cross-sectional plane 115-2 of the housing 101, wherein the first illuminant 113-1 is arranged next to the second illuminant 113-2.

The diagnostic device 105 is also adapted to detect whether a supply voltage is present at the first electric connection 103-1 and to check whether the supply voltage corresponds to predetermined voltage parameters, and when detecting a supply voltage to change the first status as a function of the predetermined voltage parameters. Furthermore, the diagnostic device 105 is adapted to detect whether there is a data transmission connection by means of the second electric connection 103-2 and to check whether the data transmission connection corresponds to predetermined connection parameters, and to change the second status when a data transmission connection is detected as a function of the predetermined connection parameters.

Figure 2B:
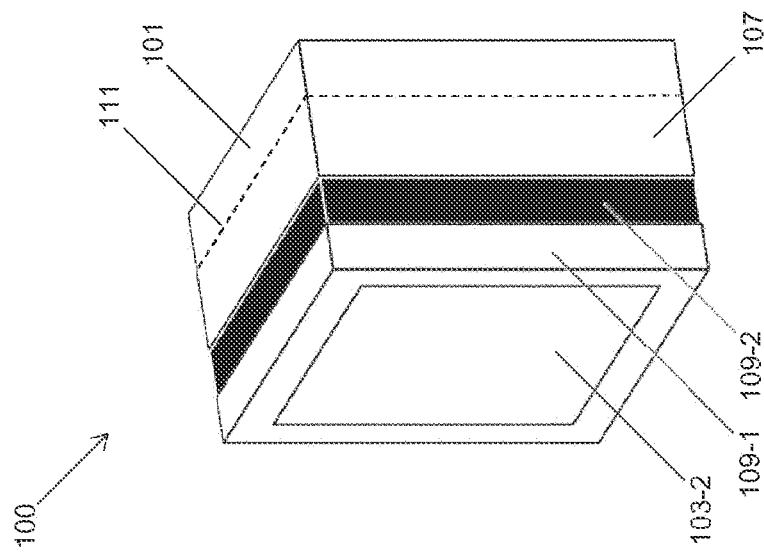
FIG. 2B shows a line connector according to the principles described herein.
Figure 2A:
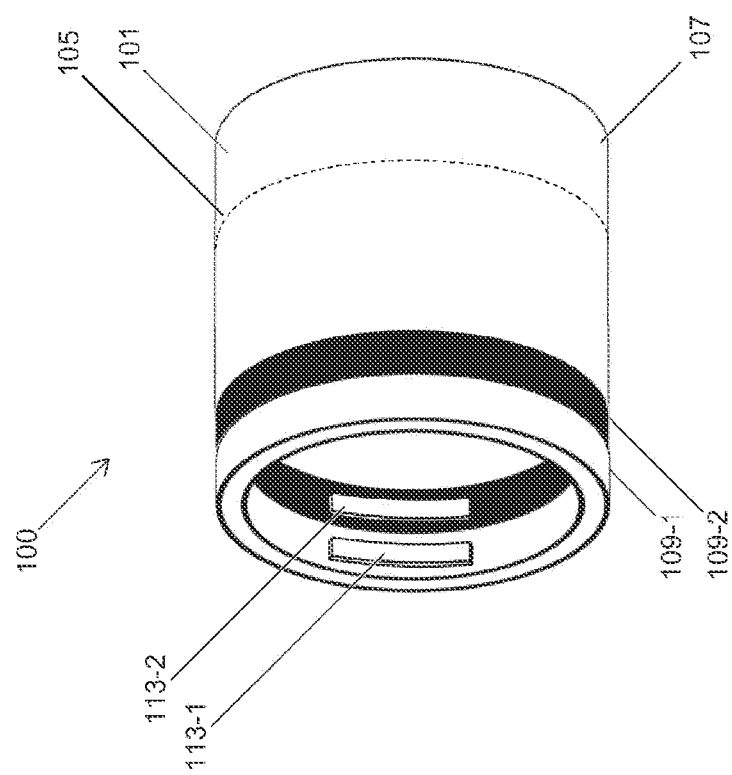
FIG. 2A shows a line connector according to the principles described herein.

FIG. 2A shows a schematic illustration of a line connector 100 for transmitting electric signals according to an example of the principles of the present disclosure. The line connector 100 comprises a housing 101, a first electric connection 103-1 for transmitting a first electric signal and a second electric connection 103-2 for transmitting a second electric signal. The line connector 100 further comprises a diagnostic device which is adapted to monitor the first electric signal in order to detect a first status of the first electric connection 103-1, and which is adapted to monitor the second electric signal to detect a second status of the second electric connection 103-2.

The first optical indicator 109-1 and the second optical indicator 109-2 each include an illuminant 113-1, 113-2, which each includes a light-emitting diode and/or an optical waveguide.

The first optical indicator 109-1 comprises a scattering element 117-1 and the second optical indicator 109-2 comprises a further scattering element 117-2. The scattering element 117-1 is adapted to scatter the optical signal of the first optical indicator 109-1 starting from a surface normal axis 119 of the housing wall 107 with a scattering angle 121 of up to 90°. Furthermore, the further scattering element 117 2 is adapted to scatter the optical signal of the second optical indicator 109-2 starting from a surface normal axis 119 of the housing wall 107 with a scattering angle 121 of up to 90°.

The first optical indicator 109-1 is adapted to display an optical signal with a preselected wavelength, brightness and/or flashing sequence by means of the light-emitting diode as a function of the first status and/or wherein the second optical indicator 109-2 is adapted by means of the further light-emitting diode to display an optical signal with a preselected wavelength, brightness and/or flashing sequence as a function of the second status.

FIG. 2B shows a schematic representation of a line connector 100 according to an example with a housing 101 which is rectangular and has a circumferential housing wall 107. The line connector 100 further comprises a first electric connection 103-1 for transmitting a first electric signal and a second electric connection 103-2 for transmitting a second electric signal. The first optical indicator 109-1 and the second optical indicator 109-2 are arranged on a circumference 111 of the housing wall 107 and the second electrical contact is arranged on an end face of the housing 101.

Figure 3G:
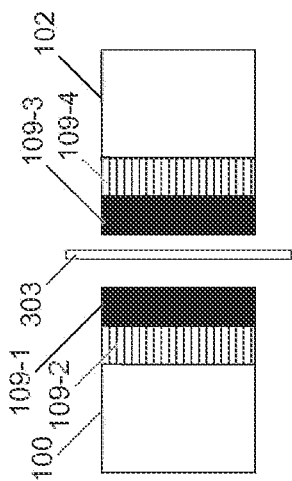
FIG. 3A, 3B, 3C, 3D, 3E, 3F, 3G show a line connector and a line connector counterpart with different optical signals according to the principles described herein.
Figure 3D:
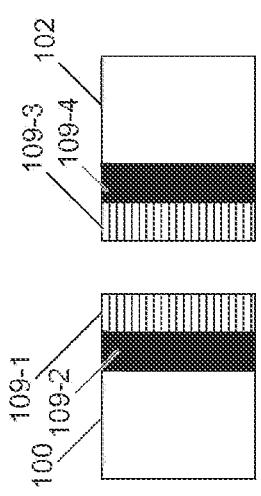
Figure 3E:
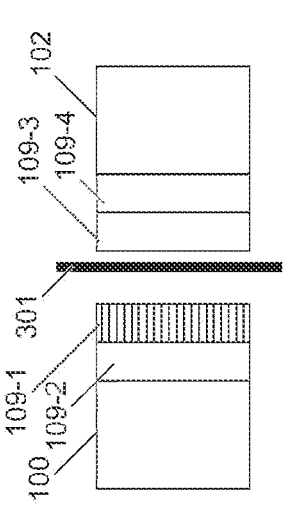
Figure 3F:
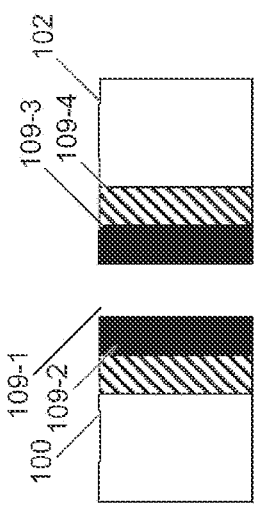
Figure 3A:
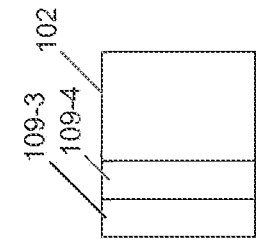

FIG. 3A shows a schematic representation of a line connector 100 and a line connector counterpart 102 according to an example. The line connector 100 comprises a diagnostic device which is adapted to monitor the first electric signal in order to detect a first status of the first electric connection 103-1, and which is adapted to monitor the second electric signal in order to detect a second status of the second electric connection 103 2.

The line connector 100 further comprises a housing 101, which has a housing wall 107 with a first optical indicator 109-1 and a second optical indicator 109-2, wherein the first optical indicator 109-1 is adapted to generate a first optical signal that represents the first status, and wherein the second optical indicator 109-2 is adapted to generate a second optical signal which represents the second status.

The line connector counterpart 102 further comprises a third electrical contact for receiving the second electric signal and a further diagnostic device which is adapted to monitor the second electric signal in order to detect a third status of the third electric connection 103-3 and by means of the third electric signal detect a power supply status and a data transmission status of the line connector counterpart 102.

The line connector counterpart 102 comprises a further housing 123, which has a further housing wall 125 with a third optical indicator 109-3 and a fourth optical indicator 109-4, the third optical indicator 109-3 being adapted to generate a third optical signal, which represents the power supply status of the line connector counterpart 102, and wherein the fourth optical indicator 109-4 is configured to generate a fourth optical signal which represents the data transmission status of the line connector counterpart 102.

The second optical indicator 109-2, the third optical indicator 109-3 and the fourth optical indicator 109-4 each do not emit light. Correspondingly, the second optical indicator 109-2 and the fourth optical indicator 109-4 signal that there is no wireless connection between the line connector 100 and the line connector counterpart 123 and/or that the signal strength of the wireless connection is low, in particular 0%. The first optical indicator 109-1 lights up in a predetermined wavelength range, which corresponds in particular to the color green and thereby signals that an electrical voltage compatible for the operation of the line connector 100 is present at the first electric connection. The third electrical indicator 109-3 does not light up and thus signals that at the line connector counterpart 102 no electrical energy is transmitted to the line connector counterpart 102, in particular via the third electrical contact, and/or that there is an insufficient or incompatible energy supply.

Figure 3B:
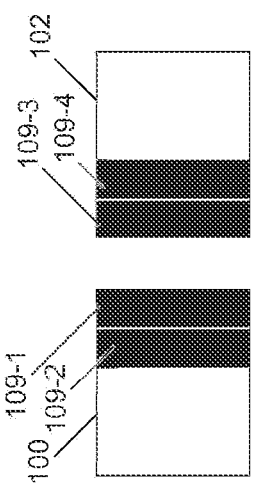

FIG. 3B shows a schematic representation of a line connector 100 and a line connector counterpart 102 according to the example shown in FIG. 3A, with all optical indicators 109-1, 109-2, 109-3, 109-4 emitting light in the same wavelength range, which corresponds in particular to the color green. Correspondingly, a power supply of the line connector 100 and the line connector counterpart 102 is compatible or sufficient for operation of the line connector 100 and the line connector counterpart 102. There is also a wireless connection with a signal strength above a predetermined signal strength limit value, in particular the signal strength is 100%.

Figure 3C:
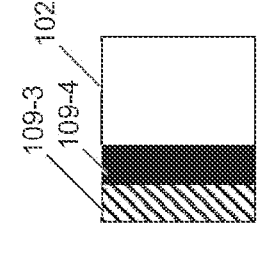

FIG. 3C shows a schematic illustration of a line connector 100 and a line connector counterpart 102 according to the example shown in FIG. 3A, with the first optical indicator 109-1 and the third optical indicator 109-3 light up in yellow and in a differing way the second optical indicator 109-2 and the fourth optical indicator 109-4 light up in the color green. There is accordingly a wireless connection between the line connector 100 and the line connector counterpart 102 with a signal strength above a predetermined signal strength limit value, in particular the signal strength is 100%.

The first status of the line connector 100 or the voltage supply status of the line connector counterpart 102 signals that there is an electrical energy supply to the line connector 100 and that of the line connector counterpart 102. However, the respective energy supply may be restricted. For example, there can be an overload on the line connector counterpart 102, which can be caused in particular by an, in particular metallic, disturbing body 301 between the second electrical contact and the third electrical contact.

FIG. 3D shows a schematic illustration of a line connector 100 and a line connector counterpart 102 according to the example shown in FIG. 3A, with the first optical indicator 109-1 and the third optical indicator 109-3 light up in red and in a differing way the second optical indicator 109-2 and the fourth optical indicator 109-4 light up in the color green. There is accordingly a wireless connection between the line connector 100 and the line connector counterpart 102 with a signal strength above a predetermined signal strength limit value, in particular the signal strength is 100%.

The first status of the line connector 100 or the voltage supply status of the line connector counterpart 102, signals that an electrical energy supply to the line connector 100 and that of the line connector counterpart 102 is disturbed. There is a corresponding restriction in the respective energy supply. For example, there can be a short circuit at the line connector counterpart 102 and/or the line connector 100. Sufficient energy transfer from the line connector 100 to the line connector counterpart 102 to maintain the wireless connection can nevertheless be provided.

FIG. 3E shows a schematic representation of a line connector 100 and a line connector counterpart 102 according to the example shown in FIG. 3A, with the first optical indicator 109-1 lighting up red and in a differing way the second optical indicator 109-2, the third optical indicator 109-3 and the fourth optical indicator 109-4 do not light up. Accordingly, there is no wireless connection between the line connector 100 and the line connector counterpart 102, and power transmission is not possible either. The line connector 100 is supplied with electrical energy, but cannot establish an electric connection to the line connector counterpart 102. Between the second electrical contact and the third electrical contact is a disturbing body which is adapted to attenuate or block electromagnetic radiation so that the line connector counterpart 102 is shielded from the line connector 100. In particular, the disturbing body 301 exceeds a maximum overlap area at which a connection would still be possible. For example, the disturbing body 301 blocks more than 60% of an overlap area between the line connector 100 and the line connector counterpart 102.

FIG. 3F shows a schematic illustration of a line connector 100 and a line connector counterpart 102 according to the example shown in FIG. 3A, wherein the first optical indicator 109-1 and the third optical indicator 109-3 lighting up in green and in a differing way the second optical indicator 109-2 and the fourth optical indicator 109-4 light up in the color yellow.

Correspondingly, a power supply of the line connector 100 and the line connector counterpart 102 is compatible or sufficient for operation of the line connector 100 and the line connector counterpart 102. Furthermore, there is a wireless connection with a signal strength in a predetermined signal strength range, which is in particular between 31% and 80% signal strength.

FIG. 3G shows a schematic illustration of a line connector 100 and a line connector counterpart 102 according to the example shown in FIG. 3A, wherein the first optical indicator 109-1 and the third optical indicator 109-3 light up in the color green and in a differing way the second optical indicator 109-2 and the fourth optical indicator 109-4 light up in red.

Correspondingly, a power supply of the line connector 100 and the line connector counterpart 102 is compatible or sufficient for operation of the line connector 100 and the line connector counterpart 102. Furthermore, there is a wireless connection with a signal strength in a predetermined signal strength range, which is in particular between 1% and 30% signal strength. A further disturbing body 303 can be arranged between the line connector 100 and the line connector counterpart 102, which is adapted to disrupt the data transmission or to reduce a signal strength of the wireless connection.

LIST OF REFERENCE SYMBOLS 100 line connector
101 housing
102 line connector counterpart
103-1 first electric connection
103-2 second electric connection
103-3 third electric connection
105 diagnostic device
107 encircling housing wall
109-1 first optical indicator
109-2 second optical indicator
109-3 third optical indicator
109-4 fourth optical indicator
111 circumference
113-1 first illuminant
113-2 second illuminant
115-1 first cross-sectional plane
115-2 second cross-sectional plane
117-1 scattering element
117-2 Further scattering element
119 surface normal axis
121 scattering angle
123 further housing
125 further housing wall
301 disturbing body
303 further disturbing body

What is claimed is:
1. A line connector for transmitting electric signals, comprising:

a housing;

a first electric connection configured to transmit a first electric signal;

a second electric connection configured to transmit a second electric signal; and a diagnostic device configured to monitor the first electric signal and detect a first status of the first electric connection, and further configured to monitor the second electric signal and detect a second status of the second electric connection, wherein the housing has a housing wall with a first optical indicator and a second optical indicator, wherein the first optical indicator is configured to generate a first optical signal which represents the first status, and wherein the second optical indicator is configured to generate a second optical signal which represents the second status, and wherein the first optical indicator comprises a scattering element configured to transmit an optical signal of the first optical indicator starting from a surface normal axis of the housing wall with a scattering angle of up to 90°.

2. The line connector according to claim 1, wherein the housing is at least partially cylindrical and has a circumferential housing wall, and wherein one or more of the first optical indicator or the second optical indicator is arranged at least partially on a circumference of the housing wall.

3. The line connector according to claim 1, wherein the first status comprises a power supply status of the line connector based on the first electric connection.

4. The line connector according to claim 1, wherein the second electric connection is configured to establish a wireless connection to a line connector counterpart and to transmit the second electric signal via the wireless connection, and wherein the second status comprises a signal strength of the wireless connection between the line connector and the line connector counterpart.

5. The line connector according to claim 4, wherein the second electric connection is configured to transmit electrical energy, including supplying energy to the line connector counterpart, and to transmit data.

6. The line connector according to claim 1, wherein the first optical indicator comprises a first illuminant and the second optical indicator comprises a second illuminant, the first illuminant and the second illuminant being configured to generate the optical signal on the housing wall over an entire circumference of the housing wall.

7. The line connector according to claim 6, wherein:

the first illuminant is configured to, based at least in part on the first status, emit light in a first defined wavelength range or a first defined number of wavelength ranges of a plurality of defined wavelength ranges or not to emit light; and the second illuminant is configured to, based at least in part on the first status, emit light in a second defined wavelength range or a second defined number of wavelength ranges of the plurality of defined wavelength ranges or not to emit light.

8. The line connector according to claim 6, wherein the first illuminant and the second illuminant are configured to generate optical signals in mutually different wavelength ranges based at least in part on the first status and the second status, respectively, such that the optical signals of the first optical indicator are visually distinguishable from the optical signals of the second optical indicator.

9. The line connector according to claim 6, wherein the first optical indicator and the second optical indicator are configured to generate optical signals in a same range of wavelengths to display connection states coherently in accordance with display information.

10. The line connector according to claim 6, wherein the first illuminant is arranged in a first cross-sectional plane of the housing and the second illuminant is arranged in a second cross-sectional plane of the housing.

11. The line connector according to claim 1, wherein the diagnostic device is configured to detect a supply voltage applied to the first electric connection, check whether the supply voltage corresponds to one or more defined voltage parameters, and change the first status as a function of the one or more defined voltage parameters.

12. The line connector according to claim 1, wherein the diagnostic device is configured to detect a data transmission connection via the second electric connection, check whether the data transmission connection corresponds to one or more defined connection parameters, and change the second status as a function of the one or more defined connection parameters.

13. The line connector according to claim 1, wherein the housing is rectangular and has a circumferential housing wall, and wherein the first optical indicator or the second optical indicator is arranged at least partially on a circumference of the housing wall.

14. The line connector according to claim 1, wherein each of the first optical indicator and the second optical indicator comprises a light-emitting diode or an optical waveguide.

15. The line connector according to claim 14, wherein the first optical indicator is configured to display the first optical signal with a first defined wavelength, brightness or flashing sequence via the light-emitting diode of the first optical indicator as a function of the first status, and wherein the second optical indicator is configured to display the second optical signal with a second defined wavelength, brightness or flashing sequence via the light-emitting diode of the second optical indicator as a function of the second status.

16. The line connector according to claim 10, wherein the first illuminant is arranged adjacent to the second illuminant.

* * * * *